United States Patent
Hirano et al.

(10) Patent No.: US 12,175,373 B2
(45) Date of Patent: Dec. 24, 2024

(54) INJECTION MOLDING MACHINE SYSTEM

(71) Applicant: THE JAPAN STEEL WORKS, LTD., Tokyo (JP)

(72) Inventors: Takayuki Hirano, Hiroshima (JP); Akihiko Saeki, Hiroshima (JP); Akira Morii, Hiroshima (JP); Hiroshi Onishi, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 1072 days.

(21) Appl. No.: 16/982,903

(22) PCT Filed: Mar. 22, 2019

(86) PCT No.: PCT/JP2019/012230
§ 371 (c)(1),
(2) Date: Sep. 21, 2020

(87) PCT Pub. No.: WO2019/182145
PCT Pub. Date: Sep. 26, 2019

(65) Prior Publication Data
US 2021/0001526 A1    Jan. 7, 2021

(30) Foreign Application Priority Data
Mar. 23, 2018  (JP) ................... 2018-055633

(51) Int. Cl.
*G06N 3/092* (2023.01)
*B29C 45/76* (2006.01)

(52) U.S. Cl.
CPC ........... *G06N 3/092* (2023.01); *B29C 45/768* (2013.01); *B29C 2945/76949* (2013.01)

(58) Field of Classification Search
CPC .............................. G06N 3/092; B29C 45/768
See application file for complete search history.

(56) References Cited

U.S. PATENT DOCUMENTS

2017/0028593 A1    2/2017  Maruyama
2017/0031330 A1*   2/2017  Shiraishi ................. G06N 7/01
(Continued)

FOREIGN PATENT DOCUMENTS

JP    63-209917 A    8/1988
JP    8-309814 A    11/1996
(Continued)

OTHER PUBLICATIONS

International Search Report dated Jun. 18, 2019 (PCT/ISA/210) issued by the International Searching Authority for International Application No. PCT/JP2019/012230.
(Continued)

*Primary Examiner* — Nathan L Laughlin
(74) *Attorney, Agent, or Firm* — Sughrue Mion, PLLC

(57) ABSTRACT

Provided is an injection molding machine system (1) that performs control of molding conditions in an injection molding machine (2) by an agent (6) including a machine learning device which performs reinforcement learning. In the present learning, physical data obtained from the injection molding machine (2) and a defect type indicating the type of a molding defect in a molded article are used as states, molding conditions are used as actions, and a defect state indicating the defect level of the molding defect is used as a reward.

6 Claims, 3 Drawing Sheets

(56) References Cited

U.S. PATENT DOCUMENTS

2018/0026573 A1\* 1/2018 Akashi .................... G06N 3/02
                                                                318/6
2018/0147645 A1\* 5/2018 Boccadoro ......... B23Q 17/2471
2018/0341248 A1\* 11/2018 Mehr ................... G05B 13/048
2018/0342069 A1\* 11/2018 Lim ..................... G06T 7/0008
2018/0373738 A1\* 12/2018 Mitarai ................ G06T 7/0004

FOREIGN PATENT DOCUMENTS

| | | |
|---|---|---|
| JP | 2006-48370 A | 2/2006 |
| JP | 2017-30152 A | 2/2017 |
| JP | 2017-30221 A | 2/2017 |

OTHER PUBLICATIONS

Written Opinion dated Jun. 18, 2019 (PCT/ISA/237) issued by the International Searching Authority for International Application No. PCT/JP2019/012230.

\* cited by examiner

INJECTION MOLDING MACHINE SYSTEM

TECHNICAL FIELD

The present invention relates to an injection molding machine system that utilizes machine learning.

BACKGROUND ART

In general, injection molding machines have an injection device and a mold clamping device. For example, the injection device is composed of a heating cylinder and a screw that is provided in the heating cylinder so as to be able to be driven in a rotation direction and an axial direction. On the other hand, for example, the mold clamping device is composed of a fixed disc to which a fixed die is attached, a movable disc to which a movable die is attached, and a die fastening mechanism for opening or closing the movable die with respect to the fixed die. The screw is driven rotationally and resin material is supplied to the heating cylinder, whereby melted resin material is measured at the tip of the heating cylinder and injected into the cavity of the fastened dies to fill it up. A mold product having a prescribed shape is obtained by opening the movable die after the resin material has been cooled and solidified.

In general, molding conditions such as an injection speed, an injection stroke, a cylinder temperature, a die fastening force, and a pressure holding time vary from one mold product to another. The molding conditions are usually adjusted by performing injection molding repeatedly to manufacture good mold products. Such adjustment of molding conditions (what is called "molding conditions determination") generally requires a skill of an operator. When a molding failure has occurred, an operator judges its kind (more specifically, a defect type such as a sink mark, a burr, or avoid) and adjusts the molding conditions according to the defect type. For example, if a mold product has a sink mark, the operator adjusts the injection speed, the injection stroke, the keeping pressure, etc.

CITATION LIST

Patent Literature

PTL 1: JP-A-2017-30152
PTL 2: JP-A-2017-30221

PTL 1 proposes an injection molding machine system in which molding conditions are adjusted by a machine learner that learns through what is called reinforcement learning. The machine learner disclosed in PTL 1 controls an injection molding machine as an agent while learning through reinforcement learning.

Generally, in the reinforcement learning, if an agent selects an action (Action) when a control target is in a prescribed state (State), the state of the control target makes a transition to another state and the agent receives a reward (Reward). The agent is provided with a value function that indicates future rewards (i.e., cumulative reward) that the agent will be able to receive if it continues to determine actions according to a prescribed policy (Policy). Value functions include a state value function that is expressed only by a state, an action value function indicating a value of a prescribed action in a certain state, etc. The agent learns repeatedly so as to update such a value function and maximize the cumulative reward.

The agent described in PTL 1 performs learning while using physical quantities relating to injection molding as a state, handling manipulation conditions (i.e., molding conditions) as an action, and receiving a calculated reward. The agent can handle various evaluation targets in calculating a reward; for example, the agent can use molding quality (good/or not good) as an evaluation target. In this case, the agent receives a positive reward if a mold product is good and receives a negative reward if a mold product has a molding defect. If the learning of the evaluation function has proceeded sufficiently, optimum molding conditions in a prescribed state can be obtained if an action (i.e., molding conditions) that maximizes the output of the evaluation function is selected.

PTL 2 proposes an abnormality diagnosing apparatus that makes an abnormality diagnosis on an injection molding machine by learning through what is called supervised learning. The abnormality diagnosing apparatus disclosed in PTL 2 employs a machine learner having an algorithm such as an SVM or a neural network, and uses internal or external state data in the injection molding machine as input data and uses abnormal or normal data of the injection molding machine as output data (i.e., teaching signal). Examples of the internal or external state data are a load of the drive unit, a frequency characteristic of the axis, a resin pressure, and an alarm generation history. If the learning of the abnormality diagnosing apparatus has proceeded sufficiently, whether the injection molding machine operates normally for prescribed state data can be judged properly.

SUMMARY OF INVENTION

Technical Problem

Once molding conditions of an injection molding machine have been determined by an operator, mold products can be mass-produced by causing the injection molding machine to operate continuously. However, if injection molding is performed repeatedly under particular molding conditions, a molding defect may occur. In other words, a molding defect may occur even under the same molding conditions due to a variation of the state of the injection molding machine caused by a variation in an external environment (e.g., a variation in external temperature or a variation in machine temperature) or wear of mechanical components such as of a screw, a reverse flow preventive ring, a toggle link, or a bush due to aging deterioration. Even if a molding defect has occurred, the molding conditions can be readjusted if an operator can find it soon. However, a molding defect may continue to exist if no operator exists near the injection molding machine as in the case of a nighttime operation.

One example measure against the above phenomenon would be adjusting the molding conditions automatically by the agent described in PTL 1. If the value function has been learned properly and sufficiently, optimum molding conditions can be calculated according to a current state of the injection molding machine and a molding failure does not continue to exist in principle. However, the state (State) handled by the agent described in PTL 1 is only physical quantities relating to injection molding. If every physical quantity were a target, the agent could accommodate every event theoretically. If all physical quantities such as the weight and the dimensions of a mold product and the appearance, length, angle, area, volume, etc. that are calculated from image data of the mold product were used as a state, the agent could output optimum molding conditions as an action (Action).

However, in a case where a large number of physical quantities are used as a state, excessive computer resources are necessary. Furthermore, the amount of calculation increases explosively and having the value function learned properly is substantially impossible in a limited time. This can be expected in the light of a method by which a skilled operator adjusts the molding conditions. In adjusting the molding conditions, a skilled operator does not adjust all conditions (i.e., injection speed, injection stroke, cylinder temperature, pressure keeping time, keeping pressure, etc.) simultaneously. The operator judges a defect type, selects molding conditions to be adjusted according to the defect type, and judges whether to increase or decrease the value of each of those molding conditions. That is, the operator selects molding conditions to be adjusted according to the defect type. This enables quick adjustment of the molding conditions. In contrast, the agent described in PTL 1 does not have information necessary to select molding conditions. For this reason, the agent needs to learn an enormous amount of information so as to be able to make a judgment that is equivalent to such selection by using other physical data.

Another measure would be adjusting molding conditions by utilizing the method described in PTL 2. More specifically, various physical conditions relating to the injection molding machine are given to a control device as input data by using a neural network or the like and molding conditions that are optimum at that time are given to the control device as training data. As the learning of the control device proceeds, the control device should come to output optimum molding conditions when receiving current physical data relating to the injection molding machine. However, optimum molding conditions are unknown in general and an enormous amount of training data necessary for learning cannot be obtained. For this reason, it is difficult for a machine learner that performs supervised learning to adjust molding conditions.

An object of the present invention is to provide an injection molding machine system that does not consume computer resources excessively, does not require much time and cost for learning, and can adjust molding conditions quickly.

Solution to Problem

[1] According to a first aspect of the invention, an injection molding machine system including: an agent having a machine learner, the machine learner performing reinforcement learning of determining an action according to a value function while receiving rewards for actions done in various states and learning the value function, and an injection molding machine configured to manufacture a mold product under prescribed molding conditions; and the injection molding machine system being configured to adjust the molding conditions using the agent, in which the machine learner is configured to: use, as the state, physical data obtained from the injection molding machine and a defect type representing a kind of a molding defect of the mold product; use the molding conditions as the action; and use, as the reward, a detect state indicating a defect degree of a molding defect.

[2] According to a second aspect of the invention, in the first aspect, the injection molding machine system further including: a defect judging device configured to measure the mold product; and a classifier configured to perform learning through supervised learning, in which the machine learner is configured to use, as the defect type and the defect state, output data obtained from the classifier when input data including measurement data of the mold product measured by using the defect judging device is input to the classifier that has performed the learning.

[3] According to a third aspect of the invention, in the second aspect, the classifier performs the learning by using plural actual product data sets each including the measurement data, the defect type, and the defect state of the actual mold product and plural quasi-data sets, and in which the quasi-data sets include the measurement data, the defect type, and the defect state obtained by modifying the actual product data sets.

Advantageous Effects of Invention

The above-described first aspect makes it possible to adjust the molding conditions of the injection molding machine system to optimum ones by means of the agent. To allow the agent to learn properly so as to be able to adjust the molding conditions to optimum ones, physical data obtained from the injection molding machine and a defect type representing a kind of a molding defect of the mold product are used as the state (State). The molding conditions are used as the action (Action) and a defect state indicating a defect degree of a molding defect is as the reward (Reward). Since the state includes a defect type, the agent selects a molding condition to be adjusted according to a defect type and determines whether to increase or decrease the value of the selected molding condition in the same manners as a skilled operator does. With the above configuration, the agent can learn in a relatively short time and hence can be increased in learning efficiency and reduced in learning cost. As a result, the agent does not consume computer resources excessively during learning. Thus, the injection molding machine system according to this aspect does not consume computer resources excessively, does not require much time and cost for learning, and can adjust molding conditions quickly.

According to the above-described second aspect, the injection molding machine system is equipped with a defect judging device which measures the mold product and a classifier which learns through supervised learning. The machine learner uses, as the defect type and the defect state, output data that is obtained from the classifier that has learned when measurement data of the mold product measured by using the defect judging device is input to the classifier. That is, the classifier outputs a defect type and a defect state on the basis of measurement data of a mold product and passes them to the agent. In other words, information is passed from the classifier to the agent without involvement of an operator. As a result, an optimum molding condition (Action) can be obtained according to a state (State) of the cycle in each molding cycle. Thus, the molding conditions can be adjusted automatically while the injection molding machine operate continuously. An example of the defect judging device is a camera. In a case where a camera is used as the defect judging device, image data taken by the camera serves as an example of measurement data.

According to the above-described third aspect, the classifier learns by using plural actual product data sets each including measurement data, a defect type, and a defect state of an actual mold product and plural quasi-data sets. Each of the plural quasi-data sets includes measurement data, a defect type, and a defect state obtained by modifying an actual product data set. In general, a large number of data sets is required to learn properly for machine learners that learn through supervised learning. However, actual samples having a defect failure cannot be obtained in a very large number. That is, in general, actual product data sets each including measurement data, a defect type, and a defect state of an actual mold product cannot be obtained in a large number. In contrast, in this aspect, since quasi-data sets are obtained by modifying actual product data sets, a large number of data sets that are required for learning can be obtained relatively easily. As a result, the efficiency of leaning of the classifier is increased and hence the classifier can output a defect type and a defect state of a mold product with high accuracy.

DESCRIPTION OF EMBODIMENTS

Figure 1:
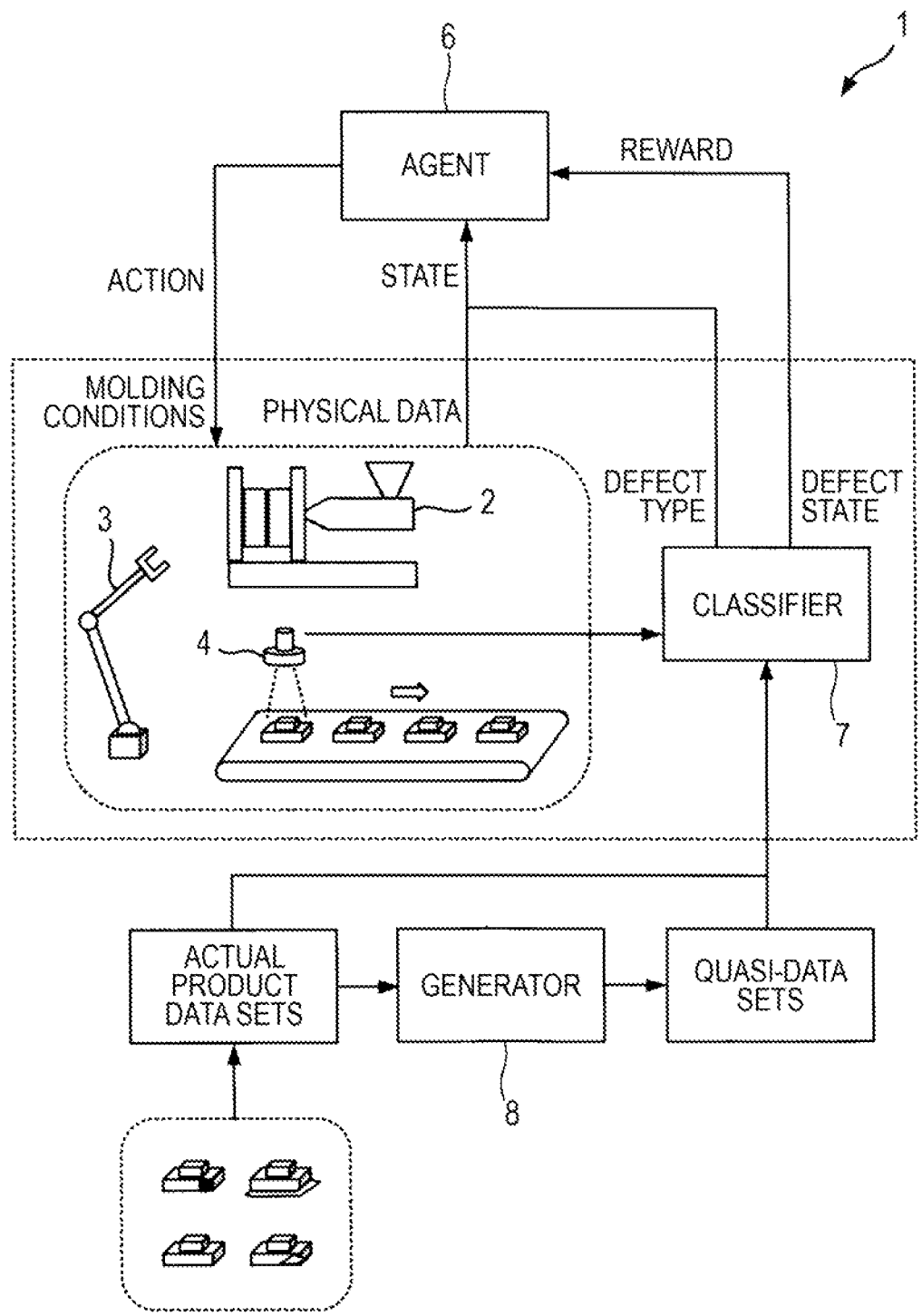
FIG. 1 is a block diagram schematically showing an injection molding machine system according to an embodiment of the present invention.

An injection molding machine system 1 according to an embodiment is a system in which the molding conditions of an injection molding machine 2 are adjusted utilizing machine learning (i.e., what is called AI). As shown in FIG. 1 in a simplified manner, as in conventional injection molding machines, the injection molding machine 2 is composed of a mold clamping device, an injection device, etc. A takeout device 3 for taking out a mold product that has been produced by the injection molding machine 2 and a camera 4 for shooting the mold product that has been taken out are installed adjacent to the injection molding machine 2. Every time a mold product is produced by the injection molding machine 2, image data of the mold product is acquired by the camera 4.

An AI system for adjusting the molding conditions in the injection molding machine system 1 is constructed on a prescribed computer and has plural function blocks. First, the AI system has an agent 6 which adjusts the molding conditions for the injection molding machine 2. The agent 6 has a machine learner which learns through reinforcement learning. The agent 6 will be described later in detail.

Among other function blocks comprising the AI system are a classifier 7 and a generator 8. As described later, the classifier 7 has a machine learner which learns through supervised learning. The classifier 7 is configured so as to judge whether a mold product is defective and to output a kind of defect (i.e., a defect type and a state of the defect, that is, a degree of the defect). To cause the classifier 7 to perform supervised learning, it is necessary to prepare, for the classifier 7, a large number of sets of data, that is, input data and output data (i.e., data sets). To this end, the generator 8 generates, as data sets, a large number of quasi-data sets including quasi-data. There will be described below work to be done by an operator and a process to be executed by the generator 8 in order to prepare a large number of data sets.

A combination of input data and output data as a data set may include any kinds of data; any combination of data is possible as long as it allows the classifier 7 to judge a mold product and output a defect type and a defect state. The embodiment employs a combination of data sets in which the input data is image data of a mold product and the output data is a defect type and a defect state. The image data is taken by the camera 4. The image data may be of any kind; the image data may be a set of plural image data taken from two or three directions or image data taken from a single direction. Furthermore, the image data may consist of plural image data taken by projecting light beams from different directions. Irrespective of what conditions are employed, the image data may be obtained by the camera 4 under unified conditions with respect to all mold products.

The defect type of output data includes plural data indicating occurrence/non-occurrence of a defect for respective types of defect and includes I/O data indicating occurrence/non-occurrence of a sink mark, I/O data indicating occurrence/non-occurrence of a burr, etc. The defect state is data indicating the degree of a defect irrespective of the defect type. That is, the defect state is data that relates to only the degree of a defect and is irrelevant to whether the defect type is a sink mark or a void. This data may be expressed by any numerical value. For example, the defective states of a good product, a product having a low-degree defect, and a product having a high-degree defect can be defined as numerical values "1.0," "−0.3," and "−0.7," respectively.

Figure 2:
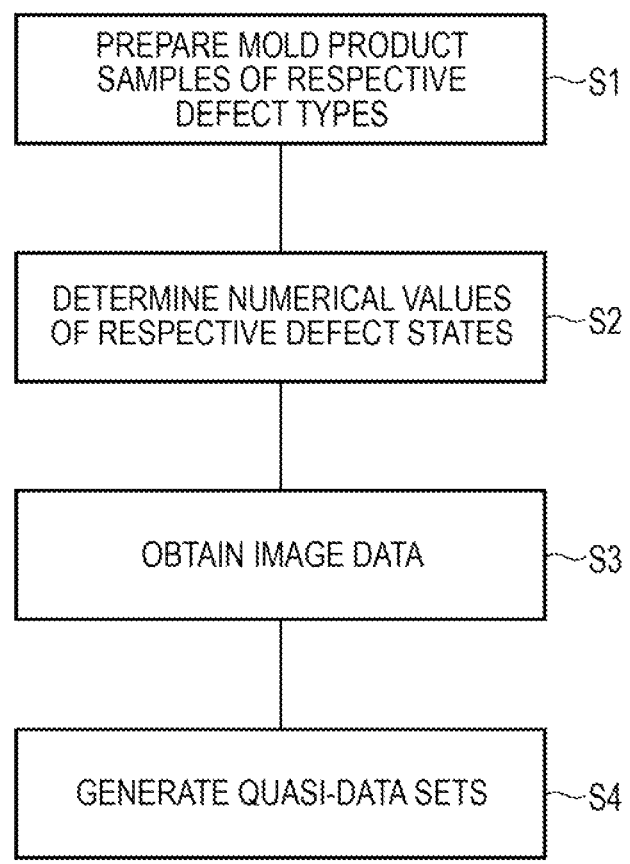
FIG. 2 is a flowchart for description of a process executed by a generator and work performed by an operator in the injection molding machine system according to the embodiment of the invention.

At step S1 shown in FIG. 2, an operator prepares a sample of a good mold product and samples of defective mold products of different defect types. For example, the operator prepares one or plural defective products having a sink mark and one or plural defective products having a burr; the operator prepares one or plural samples for each of other defect types. The operator determines a numerical value representing a defect state of each prepared defective product sample (step S2). Then the operator acquires image data of each good product sample and each defective product sample (step S3). The thus-obtained data sets each consisting of image data and a combination of a defect type and a defect state are obtained from the samples of an actual good product and actual defective products and correspond to the above-mentioned term "actual product data sets."

The generator 8 generates a large number of quasi-data sets by modifying the actual product data sets through calculation (step S4). Quasi-data sets are generated for each defect type. For example, for defective products whose defect type is "sink mark," the generator 8 modifies actual product data sets of "sink mark." More specifically, the generator 8 modifies an image file by moving a position of an actual sink mark by parallel translation of image processing or changing the size of a sink mark by enlarging/reducing of image processing. In enlarging or reducing the size of a sink mark, the generator 8 also changes the defect state value according to the size of the sink mark. The generator 8 acquires quasi-data sets in the above manner. The generator 8 generates quasi-data sets in the same manner for other defect types. Any known technique as described above may be used as a technique for modifying image data automatically through image processing. The processing performed in the generator 8 may employ a method using machine learning such as a GAN.

Figure 3:
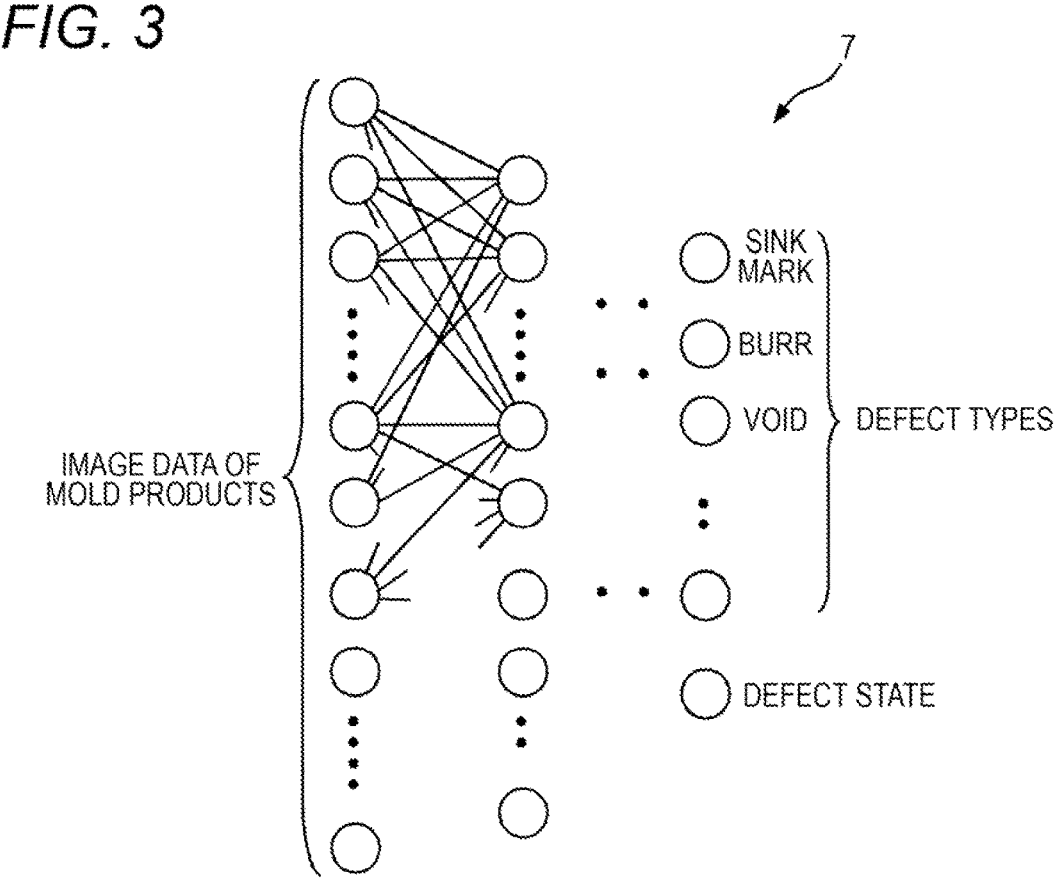
FIG. 3 is a diagram showing a classifier of the injection molding machine system according to the embodiment of the invention.

The classifier 7 is a machine learner that performs supervised learning, and there are no limitations on the type of an algorithm employed in the classifier 7. For example, the classifier 7 can employ an SVM, a least squares method, a stepwise method, or the like. However, it is preferable that an algorithm capable of expressing a nonlinear input-output relationship is employed because it is expected that input-output relationship of a data set in which the input data is image data and the output data includes a defect type and a defect state becomes nonlinear. In the embodiment, the classifier 7 is formed by a neural network. As shown in FIG. 3, the classifier 7 has a neural network that is in plural layers and is configured in such a manner that image data is applied to the neurons in an input layer and defect types and a defect state are output from the neuron in an output layer.

Image data is applied to the classifier 7 as input, and corresponding defect type and defect state are applied to the classifier 7 as teaching signals to make the classifier 7 learn by using a large number of data sets including actual product data sets and quasi-data set. After that, the classifier 7 having learned properly can output a defect type and a defect state accurately when image data of a mold product is input to it. In the injection molding machine system 1, a mold product is taken out by the takeout device 3 and shot by the camera 4 every time injection molding is performed by the injection molding machine 2. Image data taken by the camera 4 is sent to the classifier 7 and the classifier 7 outputs a defect type and a defect state.

The agent 6 employed in the embodiment will be described. In general, a machine learner that performs reinforcement learning controls a control target or an environment and is called an "agent." The agent determines an action $a_t$ (Action) on the basis of a state $s_t$ (State) of a control target and the control target makes a transition from the state $s_1$ to another state $s_{t+1}$. At this time, the agent receives a reward $r_t$ (Reward) from the control target. The agent learns so as to determine actions $a_t$ that maximize an accumulation of future rewards $r_t$ to receive. To realize the above, many agents are provided with a prescribed value function and update it through learning. When a prescribed state $s_t$ is given, the agent determines an action $a_t$ that maximizes the value of the value function in a state that the learning has advanced. The value function may be of any kind. The learning algorithm may be a known algorithm such as Q learning, a SARSA technique, TD learning, a Monte Carlo method, or an Actor-critic method. That is, the invention is characterized not in the kind of a value function or algorithm but in what data comprises the state $s_t$, the action $a_t$, and the reward $r_t$ that are handled by the agent 6 employed in the embodiment.

The action $a_t$ to be handled by the agent 6 according to the embodiment includes molding conditions such as an injection speed, an injection stroke, and a cylinder temperature. This is because the agent 6 can determine optimum molding conditions as an action $a_t$ when a prescribed state $s_t$ is given. The state $s_t$ to be handled by the agent 6 according to the embodiment includes various physical data obtained from the injection molding machine 2. The physical data include various data obtained in connection with the injection molding machine 2, such as an injection pressure, a resin temperature, and an external temperature. The state $s_t$ may include data other than these physical data, and other data may be added to the state $s_t$ when necessary. Incidentally, such a state $s_t$ is not sufficient for the agent 6 to determine optimum molding conditions. To enable selection of a molding condition to be adjusted, the state $s_t$ to be handled by the agent 6 according to the embodiment includes a defect type that is output from the classifier 7 as a state $s_t$.

Since the state $s_t$ includes a defect type, the agent 6 can judge, according to a defect type, what molding condition should be made an adjustment target and hence optimum molding conditions can be determined properly as an action $a_t$ under a given state $s_t$. The reward $r_t$ that is given to the agent 6 according to the embodiment is a defect state that is output from the classifier 7. The agent 6 can perform reinforcement learning by using the above state $s_t$, action $a_t$, and reward $r_t$. Molding conditions to be made an adjustment target may be narrowed down in a rule-based manner for each defect type by utilizing knowledge of a skilled person. For example, for the burr defect, the agent 6 may be caused to learn by giving it a rule that increases, arbitrarily, the action selection probabilities of the injection speed and the keeping pressure. For another example, the agent 6 may be caused to learn by leaving how action branching should occur depending on the defect type to the algorithm as shown in the drawing etc. of the embodiment.

Figure 4:
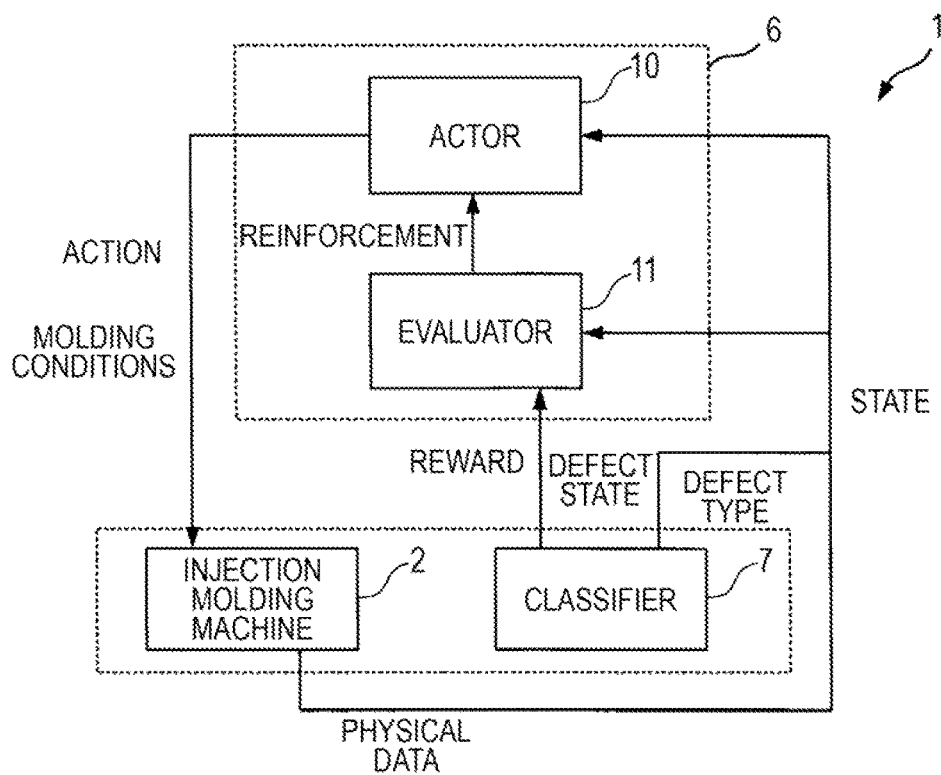
FIG. 4 is a block diagram schematically showing an injection molding machine system according to an embodiment of the present invention that is provided with an agent that employs an actor-critic algorithm.

There will be described an example in which the agent 6 according to the embodiment is caused to perform reinforcement learning by an Actor-critic method. In this case, as shown in FIG. 4, the agent 6 is composed of an actor 10 and an evaluator 11. To determine an action $a_t$ by the Actor-critic method, a state value function $V(s_t)$ is provided in the evaluator 11 as a value function. The state value function $V(s_t)$ is a function indicating how good the state st is. The state value function $V(s_t)$ may be configured in any manner. For example, the state value function $V(s_t)$ may be formed by a matrix that stores V values corresponding to respective values of the state $s_t$ or an SVM or a neural network that represents an input-output relationship. The state value function $V(s_t)$, which is updated by reinforcement learning, may be updated according to any algorithm. For example, in a case where the state value function $V(s_t)$ is updated by a TD learning method, it can be calculated according to the following Expression 1.

[Expression 1]

$$V(s_t) \leftarrow V(s_t) + \alpha[r_t + \gamma V(s_{t+1}) - V(s_t)] \qquad \text{(Expression 1)}$$

where
learning coefficient α: 0≤α≤1; and
discount rate γ: 0≤γ≤1.

When a prescribed state $s_t$ having a prescribed defect type and physical data is given in the injection molding machine 2, a mold product is obtained by determining molding conditions as an action $a_t$ and performing injection molding. The classifier 7 judges a defect state of the mold product and the evaluator 11 receives it as a reward $r_t$. Then next molding conditions are determined for a state including the defect type that is a judgment result of the classifier 7 and the injection molding machine 2 performs injection molding. The state value function $V(s_t)$ can be updated according to Expression 1 as such a molding operation is performed repeatedly.

On the other hand, the actor 10 is provided with a policy $\pi(s_t, a_t; w_t)$ which indicates what action $a_t$ should be decided on when a state $s_t$ is given. The policy $\pi(s_t, a_t; w_t)$ is a probability distribution function representing the probability at which the action $a_t$ is decided on under the state $s_t$, and $w_t$ is the adjustment parameter that determines the policy $\pi(s_t, a_t; w_t)$. For example, in a case where the policy $\pi(s_t, a_t; w_t)$ is expressed as a normal distribution $N(\mu, \sigma)$, where μ is the average and σ is the standard deviation, it can be said that adjusting the adjustment parameter $w_t$ substantially means adjustment of the average μ and the standard deviation σ that are functions of $w_t$. When the policy $\pi(s_t, a_t; w_t)$ is made a proper probability distribution function by adjusting the adjustment parameter $w_t$ by learning, the probability that a proper action $a_t$ is decided on when a prescribed state $s_t$ is given becomes high and the probability that an improper action $a_t$ is decided on becomes low. An example adjusting method of the adjustment parameter $w_t$ is the following method. First, the degree of appropriateness of the policy $\pi(s_t, a_t; w_t)$ is defined as the appropriateness $e_t$ by Equation 2-1. Then the appropriateness with a history, Dt, is defined by Equation 2-2 using a discount rate β. As a result, the adjustment parameter $w_t$ can be updated according to Expression 2-3 using the reward $r_t$ that is received as a defect state and the state value function $V(s_t)$.

[Formula (Expression) 2]

$$e_t = \frac{\partial}{\partial w_t} \log(\pi(a_t, s_t; w_t)) \quad \text{(Formula 2-1)}$$

$$D_t = e_t + \beta D_{t-1} \quad \text{(Formula 2-2)}$$

where discount rate β: 0≤β≤1.

$$w_t \leftarrow w_t + \alpha \delta_t D_t \quad \text{(Expression 2-3)}$$

where
learning coefficient α: 0≤α≤1; and
TD error $\delta_t$: $\delta_t = r_t + \gamma V(s_{t+1}) - V(s_t)$.

As the learning process is executed repeatedly, both of the state value function $V(s_t)$ and the policy $\pi(s_t, a_t; w_t)$ converge and the TD error $\delta_t$ comes close to 0. That is, a state is established that the agent 6 has learned through reinforcement learning. When a state $s_t$ is given by the policy $\pi(s_t, a_t; w_t)$ that has been rendered in this state, an optimum action $a_t$ (that is, an optimum molding condition) can be calculated.

The agent 6 according to the embodiment can have different configuration from the above description. For example, an action value function $Q(s_t, a_t)$ is used as a value function and an optimum action $a_t$, that is, optimum molding conditions, can be determined by the action value function $Q(s_t, a_t)$. The action value function $Q(s_t, a_t)$ is an evaluation function indicating how good a prescribed action $a_t$ is. The action value function $Q(s_t, a_t)$ can also be configured in various manners as with the state value function $V(s_t)$. For example, the action value function $Q(s_t, a_t)$ may be formed by a matrix in which Q values corresponding to sets of a state $s_t$ value and an action $a_t$ value are set, that is, a Q table. The action value function $Q(s_t, a_t)$ can be updated according to the following expression by Q learning:

[Expression 3]

$$Q(s_t, a_t) \leftarrow \quad \text{(Expression 3)}$$
$$Q(s_t, a_t) + \alpha \left[ r_{t+1} + \gamma \max_a Q(s_{t+1}, a_t) - Q(s_t, a_t) \right]$$

where
learning coefficient α: 0≤α≤1; and
discount rate γ: 0≤γ≤1.

As the injection molding and the learning process are performed repeatedly, the action value function $Q(s_t, a_t)$ converges and optimum molding conditions can be determined using the learned action value function $Q(s_t, a_t)$. That is, when a prescribed state $s_t$ is given, an action $a_t$ that maximizes the action value function $Q(s_t, a_t)$ is searched for. Such an action $a_t$ is an optimum molding condition.

In a case where the action value function $Q(s_t, a_t)$ is formed by a Q table, each of the state $s_t$ and the action $a_t$ are handled as discrete values. Although each of them can be handled substantially as continuous values if the Q table matrix is made huge, this causes a heavy calculation load. In contrast, if the action value function $Q(s_t, a_t)$ is formed by, for example, what is called a function approximator such as a neural network, each of the state $s_t$ and the action $a_t$ can be handled as continuous values and the calculation load can be relatively light.

The present invention is not limited to the above embodiment and various modifications can be made within the confines of the invention. For example, the invention is not limited to the above-described embodiment and modifications, improvements, etc. can be made as appropriate. Furthermore, the material, shape, dimensions, number, location, etc. of each constituent element or each set of constituent elements according to the above-described embodiment may be determined in desired manners, that is, are not subjected to any restrictions, as long as the invention can be realized.

For example, although the above embodiment has been described with an assumption that the learning converges, convergence to a final state needs not be assured in certain algorithms. Furthermore, as described in the actor-critic example, algorithms may update the policy in an explicit manner. As described in the Q learning example, the algorithm may be limited within update of the value function.

For another example, it was explained that the value function was learned by performing actual molding repeatedly in the above-described embodiment. That is, it was explained that learning is performed while actual molding is performed repeatedly (online learning). However, the value function may be learned offline in advance. Even if actual molding is not performed repeatedly, if a certain amount of data about a relationship between a state $s_t$, action $a_t$, and reward $r_t$ can be acquired in advance, the value function can be learned using those data. Early convergence can be attained if as described above learning of the value function is performed while actual molding is performed in a state that the learning of the value function has proceeded to a certain extent.

As another modification, input data to the classifier 7 may be modified. Although the embodiment was described in such a manner that input data to the classifier 7 is only image data of a mold product, physical data relating to a mold product such as a weight of the mold product, chromaticity of the mold product, and a refractive index of the mold product may be given to the classifier 7 as input data. This makes it possible to make a judgment as to more kinds of defect types.

Furthermore, the injection molding machine system according to the embodiment can be modified into a system having plural injection molding machines. That is, in a case where the same mold product is to be manufactured by plural molding machines, information may be exchanged between agents. The learning efficiency can be increased by exchanging the information and performing swarm reinforcement learning.

Furthermore, the state $s_t$ and the action $a_t$ that are handled by the agent 6 may be any kind of data. The molding conditions that are handled as the action $a_t$ may be actual values of an injection speed, an injection stroke, a cylinder temperature, etc. Changes in the molding conditions may be handled. That is, an amount of change in an injection speed, an amount of change in an injection stroke, an amount of change in a cylinder temperature, etc., may be handled. Furthermore, when data of each of the state $s_t$, the action $a_t$, and the reward $r_t$ is handled, the data may be converted by normalizing it in advance so that it has a numerical value range 0 to 1 or converted so that it has a numerical value range −1 to 1.

Still further, in the embodiment, image data taken by the camera 4 is used for defect judgment of a mold product, for example. However, in the injection molding machine system according to the invention, as long as an appearance etc. of a mold product can be measured, a defect judging device other than the camera 4 and measurement data measured by that defect judging device may be used for, for example, defect judgment of a mold product.

The present application is based on Japanese Patent Application No. 2018-055633 filed on Mar. 23, 2018, the disclosure of which is incorporated herein by reference.

INDUSTRIAL APPLICABILITY

The injection molding machine system according to the invention makes it possible to avoid excessive consumption of computer resources, to reduce the time and cost required for learning, and to adjust molding conditions quickly. The invention providing these advantages can be applied to, for example, systems that perform injection molding of a resin material.

REFERENCE SIGN LIST

1: Injection molding machine system
2: Injection molding machine
3: Takeout device
4: Camera (defect judging device)
6: Agent
7: Classifier
8: Generator
10: Actor
11: Evaluator

The invention claimed is:

1. An injection molding machine system comprising:
an agent having a machine learner, the machine learner performing reinforcement learning of determining an action according to a value function while receiving rewards for actions done in various states and learning the value function, and
an injection molding machine configured to manufacture a mold product under prescribed molding conditions; and
the injection molding machine system being configured to adjust the molding conditions using the agent,
wherein the machine learner is configured to:
use, as the state, only physical data obtained from the injection molding machine and a defect type representing a kind of a molding defect of the mold product;
use the molding conditions as the action; and
use, as the reward, a defect state indicating a defect degree of a molding defect.

2. The injection molding machine system according to claim 1, further comprising:
a defect judging device configured to measure the mold product; and
a classifier configured to perform learning through supervised learning,
wherein the machine learner is configured to use, as the defect type and the defect state, output data obtained from the classifier when input data including measurement data of the mold product measured by using the defect judging device is input to the classifier that has performed the learning.

3. The injection molding machine system according to claim 2,
wherein the classifier is configured to perform the learning by using plural actual product data sets each including the measurement data, the defect type, and the defect state of the actual mold product and plural quasi-data sets, and
wherein the quasi-data sets include the measurement data, the defect type, and the defect state obtained by modifying the actual product data sets.

4. The injection molding machine system according to claim 1, wherein the defect type includes at least one of a sink mark, a burr, a void, a short shot, burn marks, a warping, sink marks, weld lines, a jetting, or flow lines formed in the mold product by injection molding.

5. The injection molding machine system according to claim 1, wherein the defect type includes at least one of a sink mark, a burr, or a void formed in the mold product by injection molding.

6. The injection molding machine system according to claim 1,
wherein the machine learner is configured to use the physical data obtained from the injection molding machine and the defect type output from a classifier as the state, so that the machine learner judges, according to the defect type, what molding condition should be made an adjustment target and determines optimum molding conditions as an action ($a_t$) under a given state ($s_t$), and
wherein the machine learner performs the reinforcement learning by using the state ($s_t$), the action ($a_t$), and the rewards ($r_t$), the machine learner learning by leaving how action branching should occur depending on the defect type to an algorithm.

* * * * *